United States Patent
Oh et al.

(10) Patent No.: US 9,336,682 B2
(45) Date of Patent: May 10, 2016

(54) NAVIGATION SYSTEM FOR VEHICLE AND NAVIGATION SERVICE METHOD FOR THE SAME

(75) Inventors: Chi Nam Oh, Gyeonggi-do (KR); Tae Soo Kim, Seoul (KR); Min Suk Kim, Gyeonggi-do (KR); Young Eon Ma, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 299 days.

(21) Appl. No.: 12/949,428

(22) Filed: Nov. 18, 2010

(65) Prior Publication Data
US 2011/0320115 A1  Dec. 29, 2011

(30) Foreign Application Priority Data
Jun. 23, 2010  (KR) .................... 10-2010-0059590

(51) Int. Cl.
| | |
|---|---|
| G05D 1/00 | (2006.01) |
| G05D 3/00 | (2006.01) |
| G08G 1/0968 | (2006.01) |
| G01C 21/34 | (2006.01) |
| G05D 1/02 | (2006.01) |

(52) U.S. Cl.
CPC ...... *G08G 1/096816* (2013.01); *G01C 21/3469* (2013.01); *G08G 1/096844* (2013.01); *G08G 1/096866* (2013.01); *G08G 1/096888* (2013.01); *G05D 1/0295* (2013.01)

(58) Field of Classification Search
USPC ................. 701/34.3, 123, 112, 22, 429, 33, 701/117–119, 420–426, 19–20, 532, 23.93; 340/450, 450.2, 457.4, 439; 123/339.14; 903/902–903; 380/255; 455/403
See application file for complete search history.

(56) References Cited

U.S. PATENT DOCUMENTS

| | | | |
|---|---|---|---|
| 6,387,011 B1 * | 5/2002 | Bellinger ...................... 477/111 |
| 7,739,030 B2 * | 6/2010 | Desai et al. ................... 701/117 |
| 7,876,259 B2 * | 1/2011 | Schuchman ................... 342/37 |
| 7,877,198 B2 * | 1/2011 | Tenzer et al. ................. 701/123 |

(Continued)

FOREIGN PATENT DOCUMENTS

| | | |
|---|---|---|
| CN | 101509777 A | 8/2009 |
| CN | 101645200 A | 2/2010 |

(Continued)

OTHER PUBLICATIONS

An optimal control-based algorithm for Hybrid Electric Vehicle using preview route information; Dac Viet Ngo; Hofman, T.; Steinbuch, M.; Serrarens, A.F.A.; American Control Conference (ACC), 2010; Topic(s): Robotics & Control Systems Publication Year: 2010 , pp. 5818-5823.*

(Continued)

*Primary Examiner* — Cuong H Nguyen
(74) *Attorney, Agent, or Firm* — Mintz Levin Cohn Ferris Glovsky and Popeo, P.C.; Peter F. Corless (57) ABSTRACT

A navigation system for a vehicle and a navigation method for the same are disclosed. The navigation system collects transportation information and fuel efficiency information from several source vehicles located in a specific region, generates an optimum route for the corresponding region, and informs a target vehicle having requested a navigation service of the optimum route, resulting in the implementation of more effective navigation service.

14 Claims, 8 Drawing Sheets

| | | GANGNAM → YANGJAE | | | | | | | | |
|---|---|---|---|---|---|---|---|---|---|---|
| DAY | TIME ZONE | SPEED FOR EACH TRAVELING DIRECTION(km/h) | | | WAITING TIME FOR EACH TRAVELING DIRECTION(sec) | | | FUEL EFFICIENCY FOR EACH TRAVELING DIRECTION(km/l) | | |
| | | RIGHT-TURN | STRAIGHT | LEFT-TURN | RIGHT-TURN | STRAIGHT | LEFT-TURN | RIGHT-TURN | STRAIGHT | LEFT-TURN |
| MONTH | 07:00~07:10 | 3.2 | 5.3 | 3.8 | 15 | 25 | 32 | 4.1 | 5.5 | 4.8 |
| | 07:10~07:20 | 3.8 | 6.4 | 4.1 | 16 | 27 | 34 | 4.0 | 5.6 | 4.9 |
| | ⋮ | ⋮ | ⋮ | ⋮ | ⋮ | ⋮ | ⋮ | ⋮ | ⋮ | ⋮ |
| | 23:40~23:50 | 33.2 | 64.5 | 42.3 | 5 | 2 | 8 | 13.1 | 14.2 | 13.7 |
| | 23:50~24:00 | 33.8 | 67.0 | 44.5 | 4 | 2 | 7 | 13.3 | 14.3 | 13.8 |

(56) References Cited

U.S. PATENT DOCUMENTS

| | | | |
|---|---|---|---|
| 7,970,530 B2* | 6/2011 | Desai et al. | 701/117 |
| 8,009,028 B2* | 8/2011 | Uesaka et al. | 340/450.2 |
| 8,290,695 B2* | 10/2012 | Hiestermann et al. | 701/119 |
| 8,635,091 B2* | 1/2014 | Amigo et al. | 705/4 |
| 8,712,676 B2* | 4/2014 | Hiestermann et al. | 701/119 |
| 9,070,168 B2* | 6/2015 | Amigo et al. | |
| 2007/0106434 A1* | 5/2007 | Galbraith, II | B61L 25/08 701/19 |
| 2009/0210152 A1 | 8/2009 | Kawa | |
| 2010/0010699 A1* | 1/2010 | Taguchi et al. | 701/23 |
| 2010/0017110 A1 | 1/2010 | Sengoku et al. | |
| 2010/0036578 A1* | 2/2010 | Taguchi et al. | 701/93 |
| 2010/0044123 A1* | 2/2010 | Perlman et al. | 180/2.1 |
| 2010/0052888 A1* | 3/2010 | Crowe et al. | 340/461 |
| 2010/0114473 A1 | 5/2010 | Kono et al. | |
| 2010/0179752 A1 | 7/2010 | Sengoku et al. | |
| 2010/0198454 A1 | 8/2010 | Sugawara et al. | |
| 2010/0250107 A1* | 9/2010 | Desai et al. | 701/118 |
| 2011/0153367 A1* | 6/2011 | Amigo et al. | 705/4 |
| 2011/0307165 A1* | 12/2011 | Hiestermann et al. | 701/119 |
| 2011/0307166 A1* | 12/2011 | Hiestermann et al. | 701/119 |
| 2013/0245943 A1* | 9/2013 | Hiestermann et al. | 701/533 |
| 2014/0114696 A1* | 4/2014 | Amigo et al. | 705/4 |
| 2015/0269791 A1* | 9/2015 | Amigo et al. | 705/4 |

FOREIGN PATENT DOCUMENTS

| | | | |
|---|---|---|---|
| CN | 101688784 A | | 3/2010 |
| CN | 103514747 A | * | 1/2014 |
| JP | H1038594 A | | 2/1998 |
| JP | 2004-101245 A | | 4/2004 |
| JP | 2004-245609 A | | 9/2004 |
| JP | 2006-071550 A | | 3/2006 |
| JP | 2006-078326 A | | 3/2006 |
| JP | 2007-102658 A | | 4/2007 |
| JP | 2007-284049 A | | 11/2007 |
| JP | 2008-107155 A | | 5/2008 |
| JP | 2009-020685 A | | 1/2009 |
| JP | 2009-174855 A | | 8/2009 |
| JP | 2010-107459 A | | 5/2010 |
| KR | 10-2004-0037590 A | | 5/2004 |
| KR | 100780920 B1 | | 11/2007 |
| KR | 1020090058213 A | | 6/2009 |
| KR | 1020090065998 A | | 6/2009 |
| KR | 1020100038483 A | | 4/2010 |
| WO | 2008/007774 A1 | | 1/2008 |

OTHER PUBLICATIONS

A GIS Integrated Solution for Traffic Management; Necula, E.; Necula, R.; Iftene, A.; Symbolic and Numeric Algorithms for Scientific Computing (SYNASC), 2011 13th International Symposium on; Digital Object Identifier: 10.1109/SYNASC.2011.36 Publication Year: 2011 , pp. 183-190; IEEE Conference Publications.*

Modeling, simulation, analysis and control of freeway traffic corridors; Horowitz, R.; Control Applications, (CCA) & Intelligent Control, (ISIC), 2009 IEEE; DOI: 10.1109/CCA.2009.5281197; Publication Year: 2009 , p. i.*

New electrosensitive traffic light using fuzzy neural network; Yon-Sik Hong ; Hyunsoo Jin ; Chong-Kug Park; Fuzzy Systems, IEEE Transactions on; vol. 7 , Issue: 6; DOI: 10.1109/91.811247; Publication Year: 1999 , pp. 759-767.*

Estimation of optimal green time simulation using fuzzy neural network; You Sik Hong ; JongSoo Kim ; Jeong Kwangson; Chongkug Park; Fuzzy Systems Conference Proceedings, 1999. FUZZ-IEEE '99. 1999 IEEE International; vol. 2; DOI: 10.1109/FUZZY.1999.793044; Publication Year: 1999 , pp. 761-766 vol. 2.*

ITS for Sustainable Mobility: A Survey on Applications and Impact Assessment Tools; d'Orey, P.M.; Ferreira, M.; Intelligent Transportation Systems, IEEE Transactions on; Year: 2014, vol. 15, Issue: 2; pp. 477-493, DOI: 10.1109/TITS.2013.2287257.*

A k-leader fuel-efficient traffic model; Awal, T.; Kulik, L.; Ramamohanrao, K.; Intelligent Vehicles Symposium (IV), 2013 IEEE Year: 2013; pp. 1014-1021, DOI: 10.1109/IVS.2013.6629599.*

A smart trip advice model by inter-car voting data over Internet towards pleasant driving; Boyaci, A.; Kaya, M.; Dogan, S.; Akbal, E.; Eren, H; Connected Vehicles and Expo (ICCVE), 2014 International Conference on; Year: 2014; pp. 759-764, DOI: 10.1109/ICCVE.2014.7297652.*

Quantifying variability in detailed energy useage on repeated trips in the chevrolet volt; Dolan, D.S.L.; Taufik, T.; Ducasse, M. Electric Vehicle Symposium and Exhibition (EVS27), 2013 World; Year: 2013; pp. 1-5, DOI: 10.1109/EVS.2013.6914758.*

* cited by examiner

Route1

|  | A CROSSROADS | AB STRAIGHT | B CROSSROADS | BD STRAIGHT | D CROSSROADS |
|---|---|---|---|---|---|
| VEHICLE SPEED (km/h) | 40 | 52 | 42 | 59 | 31 |
| WAITING TIME (SEC) | 15 | 0 | 21 | 0 | 3 |
| AVERAGE FUEL EFFICIENCY(km/l) | 7.5 | 8.6 | 7.1 | 8.8 | 7.9 |

Route2

|  | A CROSSROADS | AC STRAIGHT | C CROSSROADS | CD STRAIGHT | D CROSSROADS |
|---|---|---|---|---|---|
| VEHICLE SPEED (km/h) | 30 | 42 | 33 | 45 | 37 |
| WAITING TIME (SEC) | 6 | 0 | 15 | 0 | 4 |
| AVERAGE FUEL EFFICIENCY(km/l) | 6.0 | 8.4 | 6.9 | 7.3 | 8.8 |

Fig.7

| DAY | | | GANGNAM → YANGJAE | | | | | | | |
|---|---|---|---|---|---|---|---|---|---|---|
| | TIME ZONE | SPEED FOR EACH TRAVELING DIRECTION(km/h) | | | WAITING TIME FOR EACH TRAVELING DIRECTION(sec) | | | FUEL EFFICIENCY FOR EACH TRAVELING DIRECTION(km/l) | | |
| | | RIGHT-TURN | STRAIGHT | LEFT-TURN | RIGHT-TURN | STRAIGHT | LEFT-TURN | RIGHT-TURN | STRAIGHT | LEFT-TURN |
| | 07:00~07:10 | 3.2 | 5.3 | 3.8 | 15 | 25 | 32 | 4.1 | 5.5 | 4.8 |
| | 07:10~07:20 | 3.8 | 6.4 | 4.1 | 16 | 27 | 34 | 4.0 | 5.6 | 4.9 |
| MONTH | ... | ... | ... | ... | ... | ... | ... | ... | ... | ... |
| | 23:40~23:50 | 33.2 | 64.5 | 42.3 | 5 | 2 | 8 | 13.1 | 14.2 | 13.7 |
| | 23:50~24:00 | 33.8 | 67.0 | 44.5 | 4 | 2 | 7 | 13.3 | 14.3 | 13.8 |

Fig.8

NAVIGATION SYSTEM FOR VEHICLE AND NAVIGATION SERVICE METHOD FOR THE SAME

CROSS-REFERENCE TO RELATED APPLICATION

This application claims priority to Korean patent application No. 10-2010-0059590 filed on Jun. 23, 2010, the disclosure of which is hereby incorporated in its entirety by reference.

BACKGROUND OF THE INVENTION

Embodiments of the present invention relate to a navigation system and a navigation service method for the same.

A conventional navigation system for vehicles collects data including the moving speeds of vehicles located in individual regions in real time, and provides a user with a driving route along which a vehicle runs at the highest traveling speed, according to the vehicle traveling speed.

One disadvantage of conventional navigation systems for vehicles is that it provides vehicles with navigation information irrespective of road types.

For example, in a straight traffic lane, with a left-turn traffic lane, and a right-turn traffic lane at a crossroads, a vehicle generally moves at different moving speeds in individual traffic lanes. The problem is that a conventional navigation system has difficulty in reflecting such a difference in moving speeds of the vehicle to a navigation process. As a result, it is impossible for the conventional navigation system to search for an accurate traveling path to a destination and to correctly calculate a fuel amount consumed in a corresponding section, such that it is unable to search for a route that minimizes the amount of fuel consumption.

In addition, the conventional vehicle navigation system has been designed to provide a navigation service to a vehicle driver in consideration of only the moving speed of a vehicle, irrespective of a geographical status of a road (e.g., an ascent, a flatland or a descent). Therefore, the vehicle navigation system for minimizing the amount of fuel consumption has a disadvantage in that it unexpectedly guides the vehicle driver to an undesirable traveling path incurring much more fuel consumption.

For example, assuming that there is a descent where decelerating of the vehicle is needed and an ascent where accelerating of the vehicle is needed, the conventional navigation system informs the vehicle driver of the ascent instead of the descent because it considers only the vehicle moving speed, resulting in much more fuel consumption.

BRIEF SUMMARY OF THE INVENTION

Various embodiments of the present invention are directed to providing a navigation system for a vehicle and a navigation service method for the same that substantially obviate one or more problems due to limitations and disadvantages of the related art.

It is an object of the present invention to provide a navigation system for reducing fuel consumption using transportation information, fuel efficiency (fuel mileage) information, geographical information, and at the same time quickly directing the vehicle to a destination.

In one aspect of the present invention, a navigation system for a vehicle includes a receiver for receiving transportation information and fuel efficiency information from, one or more source vehicles located in a specific region; a central processing unit (CPU) for generating navigation information of the specific region using the transportation information and the fuel efficiency information; and a transmitter for receiving navigation information from the CPU, and transmitting the received navigation information to a target vehicle.

In one embodiment, the CPU may calculate a vehicle speed for each traveling direction of the one or more source vehicles, an average waiting time for each traveling direction of the one or more source vehicles, and average fuel efficiency for each traveling direction of the one or more source vehicles using the transportation information and the fuel efficiency information, and generates the navigation information using the calculated information.

In other embodiments, when a plurality of identical routes are searched for in an operation for searching for a route on the basis of a distance from a departure to a destination, the CPU may determine an optimum route using the transportation information and the fuel efficiency information.

In another embodiment, the invention provides a navigation system wherein the CPU, when a first route in which an average vehicle speed from a departure to a destination is excellent, is different from a second route in which fuel efficiency is excellent, the CPU may inform the target vehicle of the first and second routes so that a vehicle driver is able to select one of the first and second routes.

In certain embodiments, the invention provides a navigation system wherein the CPU, when a plurality of identical routes are searched for in an operation for searching for a route on the basis of a distance from a departure to a destination, determines an optimum route using the transportation information and the fuel efficiency information.

In another embodiment, the CPU, when a first route in which an average vehicle speed from a departure to a destination is excellent, is different from a second route in which fuel efficiency is excellent, informs the target vehicle of the first and second routes so that a vehicle driver is able to select one of the first and second routes.

In various embodiments, the CPU additionally reflects geographical information of the specific region to generate the navigation information.

In other embodiments, the CPU, when a plurality of identical routes are searched for in the operation for generating the navigation information using the transportation information and the fuel efficiency information, determines an optimum route based on the geographical information.

In various embodiments, the invention provides a navigation system wherein the geographical information includes information about a road slope.

In some embodiments, the navigation system may further include a database for accumulating the transportation information and the fuel efficiency information of the specific region, and storing the accumulated information.

In certain embodiments, upon receiving no transportation information and no fuel efficiency information from the source vehicles, the CPU may generate the navigation information using the transportation information and the fuel efficiency information pre-stored in the database.

In certain embodiments, the CPU may provide the target vehicle with the navigation information that is generated using the transportation information and the fuel efficiency information real-time received from the source vehicles, during a predetermined time zone from a start time to a predetermined time; and may provide the target vehicle with the navigation information generated using the transportation information and fuel efficiency information pre-stored in the database after the predetermined time.

In another aspect, the present invention provides a navigation method for a vehicle comprising: a) receiving a route search request for a specific region from a target vehicle; b) receiving transportation information and fuel efficiency information from source vehicles located in the specific region; c) generating navigation information using the transportation information and the fuel efficiency information; and d) transmitting the generated navigation information to the target vehicle.

In one embodiment, the receiving step b) may include receiving information about a moving speed of each source vehicle located in the specific region, information about a crossroads waiting time of each source vehicle, information about fuel consumption of each source vehicle, and information about a moving distance of each source vehicle.

In certain embodiments, the generating step c) may include calculating a vehicle speed for each traveling direction of the source vehicles, an average waiting time for each traveling direction and average fuel efficiency for each traveling direction; and generating the navigation information using the calculated information.

In certain embodiments, the transmitting step d) may include, when a first route in which an average vehicle speed from a departure to a destination is excellent, is different from a second route in which fuel efficiency is excellent, informing the target vehicle of the first and second routes so that a vehicle driver is able to select one of the first and second routes.

DESCRIPTION OF EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
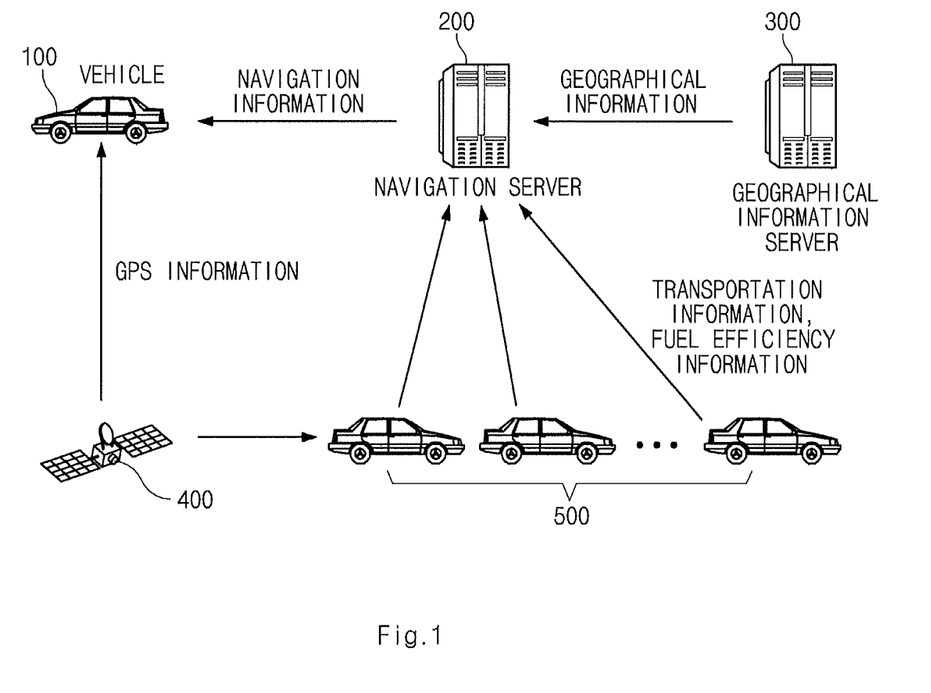
FIG. 1 is a structural view illustrating an overall system including a navigation system (or a navigation server) for a vehicle according to an embodiment of the present invention.

FIG. 1 is a structural view illustrating an overall system including a navigation system (or a navigation server) for a vehicle according to an embodiment of the present invention.

The system shown in FIG. 1 includes a target vehicle 100, a navigation server 200, a geographical information server, a satellite 400 and a plurality of source vehicles 500.

In this case, a plurality of source vehicles 500 may represent vehicles located in a specific region. For example, a plurality of source vehicles 500 may represent vehicles located between subway station "A" to subway station "B", moving in the direction of subway station "A".

Each source vehicle 500 recognizes its own current position upon receiving Global Positioning System (GPS) information from the satellite 400, and transmits the recognized position information to the navigation server 200. As a result, the navigation server 200 can recognize the current position of each source vehicle 500 in real time. The navigation server 200 may manage source vehicles in individual regions (i.e., road sections) on the basis of the current position of each source vehicle 500. For example, the navigation server 200 classifies vehicles receiving the inventive navigation service according to individual regions, so that it can receive a variety of information related to the corresponding region from vehicles located in individual regions.

The navigation server 200 receives transportation information and fuel efficiency information from several source vehicles located in a specific region.

The transportation information may indicate not only a vehicle moving speed depending upon the vehicle moving direction but also an intersection waiting time in a specific region. In this case, vehicle speed depending upon the vehicle moving direction is classified into a moving speed of a vehicle running on a left-run traffic lane, a moving speed of a vehicle running on a straight traffic lane, and a moving speed of a vehicle running on a right-turn traffic lane. In addition, the left-turn traffic lane, the straight traffic lane or the right-turn traffic lane are assigned different traffic signaling times, so that different waiting times are also assigned to the individual traffic lanes. Therefore, the intersection waiting time represents a waiting time at an intersection for each traffic lane.

The fuel efficiency information represents not only an amount of fuel consumed for vehicle running in a specific region, but also the moving distance of the vehicle traveling in the corresponding region.

Each source vehicle travels a specific region, and at the same time transmits information of the amount of fuel consumption and information of the moving distance (i.e., information about fuel efficiency) to the navigation server 200.

The navigation server 200 receives fuel efficiency information from several source vehicles 500 located in a specific region in real time, and thus calculates an average fuel efficiency of the source vehicles 500 located in the specific region in real time. In this case, the navigation server 200 may calculate the average fuel efficiency of the source vehicles in different ways according to vehicle types.

The navigation server 200 receives geographical information from the geographical information server 300.

The geographical information represents the slope of roads on which several source vehicles move in a specific region. For example, the geographical information may represent whether the corresponding road is an ascent, a flatland, or a descent. Further, the geographical information may also represent whether the corresponding road is a steep ascent (e.g., gradient of about 15° or more), a common ascent (e.g., gradient of less than about 15°, a flatland, a common descent (e.g., gradient of less than about 15°, or a steep descent (e.g., gradient of about 15° or more).

In this case, although the navigation server 200 may search for a traveling path by reflecting transportation information, fuel efficiency information, and geographical information, it should be noted that the navigation server 200 may search for a necessary traveling path using both the transportation information and the fuel efficiency information and may further reflect geographical information according to a traffic situation as necessary.

For example, the navigation server 200 basically searches for a traveling path according to transportation information and fuel efficiency information, and thus transmits the searched traveling path to the target vehicle 100. However, if a plurality of identical paths are detected during the path searching process depending upon transportation information and fuel efficiency information, the navigation server 200 additionally reflects geographical information to search for a path having many more flatlands than ascents and a path having many more descents than the flatlands, so that it can provide the searched paths to the target vehicle 100.

Figure 2:
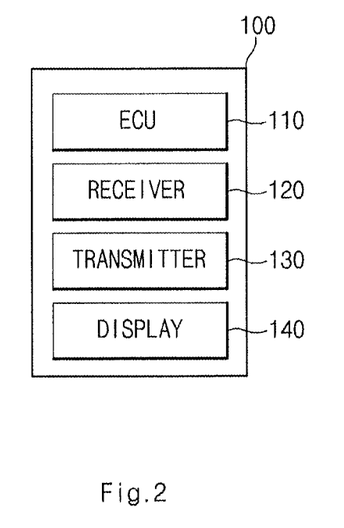
FIG. 2 is a structural view illustrating a target vehicle according to an embodiment of the present invention.

FIG. 2 is a structural view illustrating a target vehicle 100 shown in FIG. 1 according to an embodiment of the present invention.

Referring to FIG. 2, the target vehicle 100 includes an Engine Control Unit (ECU) 110, a receiver 120, a transmitter 130, and a display 140.

The ECU 110 controls operations of internal constituent elements of the target vehicle 100. For example, the ECU 110 may control the receiver 120, the transmitter 130, and the display 140.

The receiver 120 receives navigation information (i.e., path information) from the navigation server 200, and transmits the received navigation information to the ECU 110. The ECU 110 provides the received navigation information to the vehicle driver through the display 140.

In addition, the receiver 120 receives GPS information from the satellite 400, and transmits the GPS information to the ECU 110. The ECU 110 may recognize a current position of the target vehicle 100.

The transmitter 130 may transmit a variety of vehicle information to the navigation server 200. For example, the transmitter 130 receives position information of the target vehicle 100 from the ECU 110, and transmits the position information to the navigation server 200. The transmitter 130 receives departure (start point) and destination (end point) information and transportation information and fuel efficiency information from the ECU 110, and transmits the received information to the navigation server 200.

Upon receiving navigation information from the ECU 110, the display 140 may display the navigation information on the display screen.

Although an embodiment of the present invention has disclosed that constituent elements shown in FIG. 2 belong to the target vehicle 100 for convenience of description and better understanding of the present invention, it should be noted that each source vehicle 500 may also include the same constituent elements as necessary.

Figure 3:
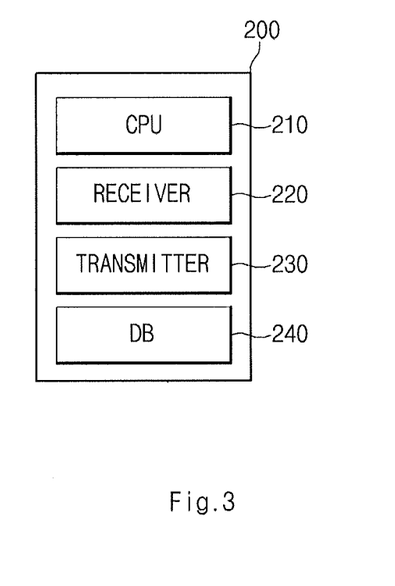
FIG. 3 is a structural view illustrating a navigation server according to an embodiment of the present invention.

FIG. 3 is a structural view illustrating a navigation server according to an embodiment of the present invention.

Referring to FIG. 3, the navigation server 200 includes a Central Processing Unit (CPU) 210, a receiver 220, a transmitter 230, and a database 240.

The CPU 210 controls operations of the constituent elements belonging to the navigation server 200. For example, the CPU 210 may control the receiver 220, the transmitter 230, and the database 240.

The CPU 210 calculates a variety of information received through the receiver 220, so that it generates navigation information on the basis of the calculated result.

The receiver 220 receives a variety of information from the target vehicle 100, the geographical information server 300, and the source vehicle 500 through a wired/wireless communication network. For example, the receiver 220 may receive current position information, transportation information, and fuel efficiency information from the target vehicle 100 or each of the source vehicles 500. In addition, the receiver 220 may further receive geographical information from the geographical information server 300.

The transmitter 230 transmits a variety of information created in the inside of the navigation server 200. For example, the transmitter 230 may transmit the navigation information generated by the CPU 210 to the target vehicle 110. In addition, the transmitter 230 may transmit other navigation information (e.g., a signal for requesting a current position) to the target vehicle 100 or each source vehicle 500.

The database (DB) 240 stores a variety of information received through the receiver 220 and a variety of information generated in the CPU 210. For example, the DB 240 may receive position information, transportation information, and geographical information of the vehicles 100 and 500 from the receiver 200, and store them.

The DB 240 may accumulate and store a variety of information. In this case, the CPU 210 may generate the patterned navigation information on the basis of the accumulated information. For example, although the aforementioned navigation information is generated on the basis of real-time transportation information and real-time fuel efficiency information, navigation information may also be generated on the basis of transportation information and fuel efficiency information accumulated in the DB 240.

Figure 4:
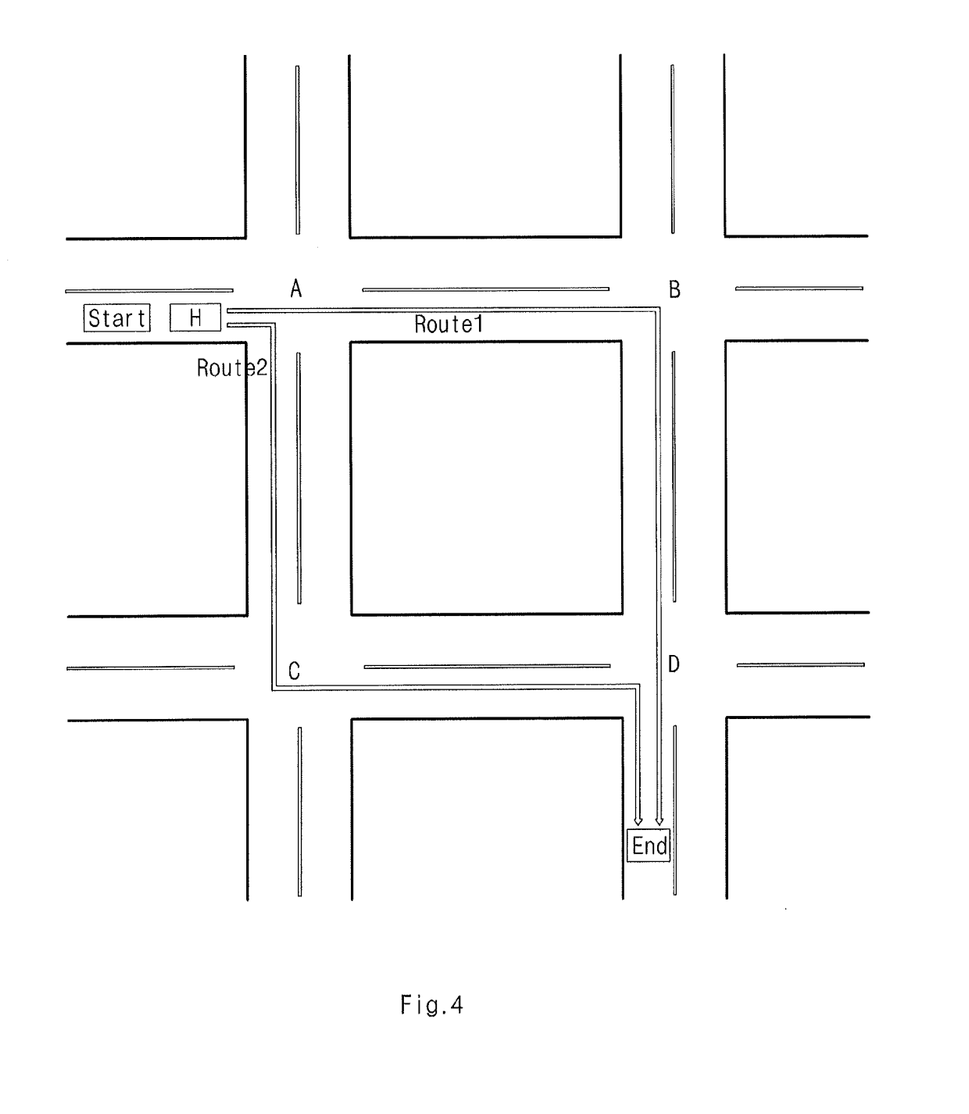
FIG. 4 is a conceptual diagram illustrating a method for enabling a navigation server to generate navigation information according to an embodiment of the present invention.

FIG. 4 is a conceptual diagram illustrating a method for enabling the navigation server 200 to generate navigation information according to an embodiment of the present invention.

Referring to FIG. 4, if the H vehicle transmits departure (start point) and destination (end point) information to the navigation server 200 and at the same time requests navigation information from the navigation server 200, the navigation server 200 may search for a first route (Route 1) and a second route (Route 2), each of which has the same distance between the departure and the destination.

For example, although the primarily searched path is decided on the basis of the distance between the departure and the destination, the scope or spirit of the present invention is not limited thereto.

Vehicles accessing the navigation server 200 transmit current position information to the navigation server 200 at intervals of a predetermined time. For example, each vehicle may receive GPS information from the satellite 400 every 10 seconds, 20 seconds, or 1 minute, etc., and at the same time transmit the received GPS information to the navigation server 200.

The navigation server 200 analyzes the received position information, and determines vehicles located between the departure and the destination requested by the H vehicle among all vehicles accessing the navigation server 200 to be source vehicles 500.

The navigation server 200 collects transportation information and fuel efficiency information needed for generating navigation information from the source vehicles 500.

A method for enabling the CPU 210 of the navigation server 200 to analyze the collected transportation information will hereinafter be described with reference to FIGS. 5 and 6.

Figure 5:
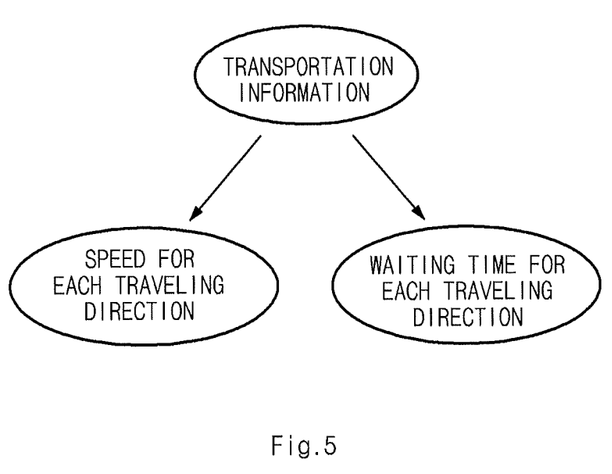
FIG. 5 is a structural view illustrating transportation information for use in a navigation server according to an embodiment of the present invention.

FIG. 5 is a structural view illustrating transportation information for use in the navigation server according to an embodiment of the present invention.

Referring to FIG. 5, transportation information according to the present invention may include a vehicle speed for each traveling direction of each vehicle and a waiting time for each traveling direction of each vehicle.

Figure 6:
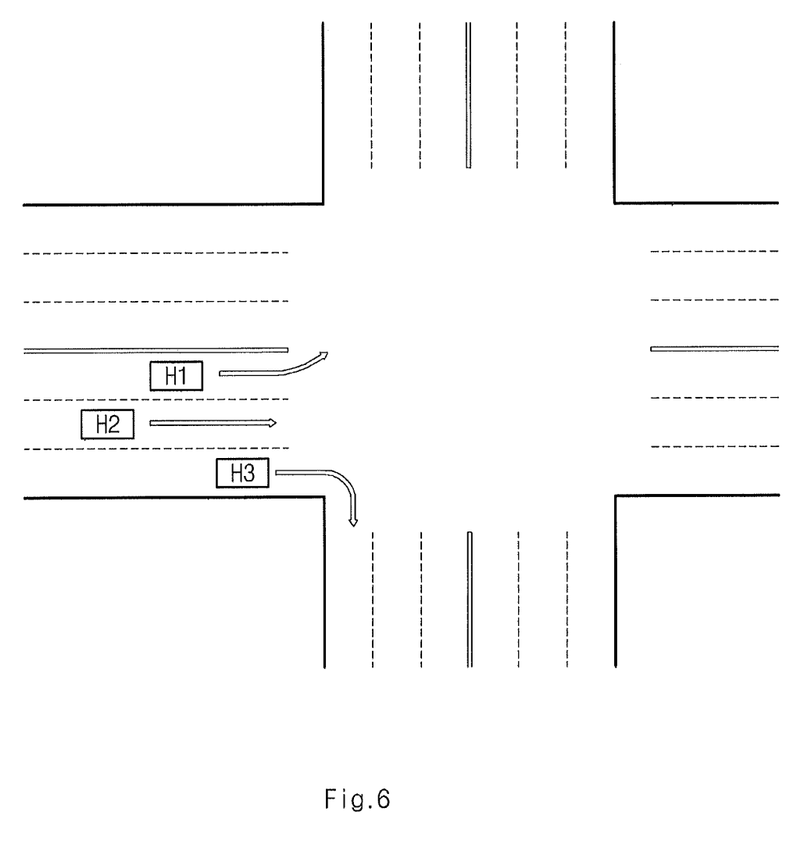
FIG. 6 shows a plurality of vehicles having different traveling directions.

FIG. 6 shows a plurality of vehicles having different traveling directions in the navigation system according to an embodiment of the present invention.

Referring to FIG. 6, the H1 vehicle is running on a left-turn traffic lane, the H2 vehicle is running on a straight traffic lane, and the H3 vehicle is running on a right-turn traffic lane.

In this case, individual vehicles may have different moving speeds in individual traffic lanes.

For example, assuming that a relatively large number of vehicles are running on the left-turn traffic lane, only the H2 vehicle is running on the straight traffic lane, and a relatively small number of vehicles are running on the right-turn traffic lane, the H1 vehicle may have a moving speed of 5 km/h, the H2 vehicle may have a moving speed of 40 km/h, and the H3 vehicle may have a moving speed of 30 km/h because the decelerating of the H3 vehicle is needed for the right-turning.

The navigation server 200 determines which traffic lane includes each vehicle through the received location information.

The navigation server 200 receives a moving speed of each vehicle, and determines what speed a vehicle for each traffic lane is moving at.

As can be seen from the above-mentioned example, assuming that a first vehicle located in the left-turn traffic lane is moving at 5 km/h, a second vehicle located in the straight traffic lane is moving at 40 km/h, and a third vehicle located in the right-turn traffic lane is moving at 30 km/h, the navigation server 200 may recognize the moving speed of 5 km/h of the first vehicle, the moving speed of 40 km/h of the second vehicle, and the moving speed of 30 km/h of the third vehicle.

Transportation information may include a waiting time for each traveling direction.

Referring to FIG. 6, the navigation server 200 analyzes a path where the position of the vehicle is changed to another position, so that it can recognize a waiting time of each vehicle at a crossroads.

For example, assuming that the H1 vehicle located in the left-turn traffic lane takes 23 seconds to stop in front of a crossroads and exit the crossroads, the H2 vehicle located in the straight traffic lane takes 15 seconds to stop in front of a crossroads and exit the crossroads, and the H3 vehicle located in the right-turn traffic lane takes 6 seconds to stop in front of a crossroads and exit the crossroads, the navigation server 200 can recognize that the H1 vehicle has a waiting time of 23 seconds, the H2 vehicle has a waiting time of 15 seconds, and the H3 vehicle has a waiting time of 6 seconds.

Although FIG. 6 assumes that one vehicle is running on each traffic lane, if several vehicles are running on each traffic lane, the navigation server 200 averages the waiting times of individual vehicles, and uses the average waiting time.

Furthermore, the navigation server 200 may average the waiting times of different types of vehicles running on individual traffic lanes, and use the average waiting time. In other words, the navigation server 200 classifies vehicles according to vehicle types using the pre-registered vehicle type information, and calculates a waiting time for each vehicle type.

Meanwhile, the navigation server 200 receives fuel efficiency information from the source vehicles 500.

The fuel efficiency information represents the amount of fuel consumption and the traveling distance of each vehicle traveling in a specific region.

The navigation server 200 receives fuel efficiency information from the source vehicles 500 in real time, and at the same time calculates an average fuel efficiency of the source vehicles 500 using the received fuel efficiency information.

For example, assuming that the number of source vehicles 500 is 100, the 100 source vehicles 500 consume 80 liters of fuel, and the moving distance of the 100 source vehicles 500 is 200 km, the average fuel efficiency is 2.5 km/l.

The navigation server 200 may calculate the average fuel efficiency for each vehicle type in different ways.

For example, if the number of HM1-type vehicles running in a specific region is 10, the 10 HM1-type vehicles consume 6 liters of fuel, and the moving distance of the 10 HM1-type vehicles is 20 km, the average fuel efficiency of these HM1-type vehicles is 3.3 km/l. For another example, if the number of HM2-type vehicles is 20, the 20 HM2-type vehicles consume 3 liters of fuel, and the moving distance of the 20 HM2-type vehicles is 40 km, the average fuel efficiency of these HM2-type vehicles is 13.3 km/l.

The navigation server 200 may classify fuel efficiency information according to individual traveling directions in the same manner as in transportation information, and use the classified fuel efficiency information.

Referring back to FIG. 6, it is assumed that the H1 vehicle consumes 0.2 liters of fuel per kilometer before entering the crossroads, the H2 vehicle consumes 0.1 liter of fuel per kilometer before entering the crossroads, and the H3 vehicle consumes 0.4 liters of fuel per kilometer before entering the crossroads.

In this case, the average fuel efficiency of vehicles located in the left-turn traffic lane is 5 km/l, the average fuel efficiency of vehicles located in the straight traffic lane is 10 km/l, and the average fuel efficiency of vehicles located in the right-turn traffic lane is 2.5 km/l.

The navigation server 200 receives geographical information from the geographical information server 300.

The geographical information may indicate a road status (e.g., a road slope) in a specific region. For example, the geographical information may represent whether the corresponding road is an ascent, a flatland, or a descent. Further, the geographical information may also represent whether the corresponding road is a steep ascent (e.g., gradient of about 15° or more), a common ascent (e.g., gradient of less than about 15°, a flatland, a common descent (e.g., gradient of less than about 15°, or a steep descent (e.g., gradient of about 15° or more).

As described above, although the navigation server 200 generates a variety of information needed for navigation using transportation information and fuel efficiency information, the navigation server 200 may further consider the geographical information as necessary.

For example, assuming that several identical paths are detected according to transportation information and fuel efficiency information, the navigation server 200 informs the vehicle driver of a flatland instead of an ascent or also informs the vehicle driver of a path having many more descents than the flatlands, so that it can provide the searched paths to the target vehicle 100.

Referring back to FIG. 4, the method for allowing the CPU 210 of the navigation server 200 to search for an optimum path from the departure to the destination using a variety of information (e.g., a vehicle speed for each traveling direction, a waiting time for each traveling direction, an average fuel efficiency for each traveling direction, and a road slope) acquired from transportation information, fuel efficiency information, and geographical information will hereinafter be described in detail.

In FIG. 4, Route 1 and Route 2 substantially have the same distance. In this case, assuming that transportation information, fuel efficiency information, and geographical information are not considered in the selection process of Route 1 or Route 2, a driver of the H vehicle may select any one of Route 1 and Route 2 irrespective of route types.

However, the navigation server 200 according to the present invention decides an optimum path using the information acquired from transportation information, fuel efficiency information, and geographical information.

Figure 7:
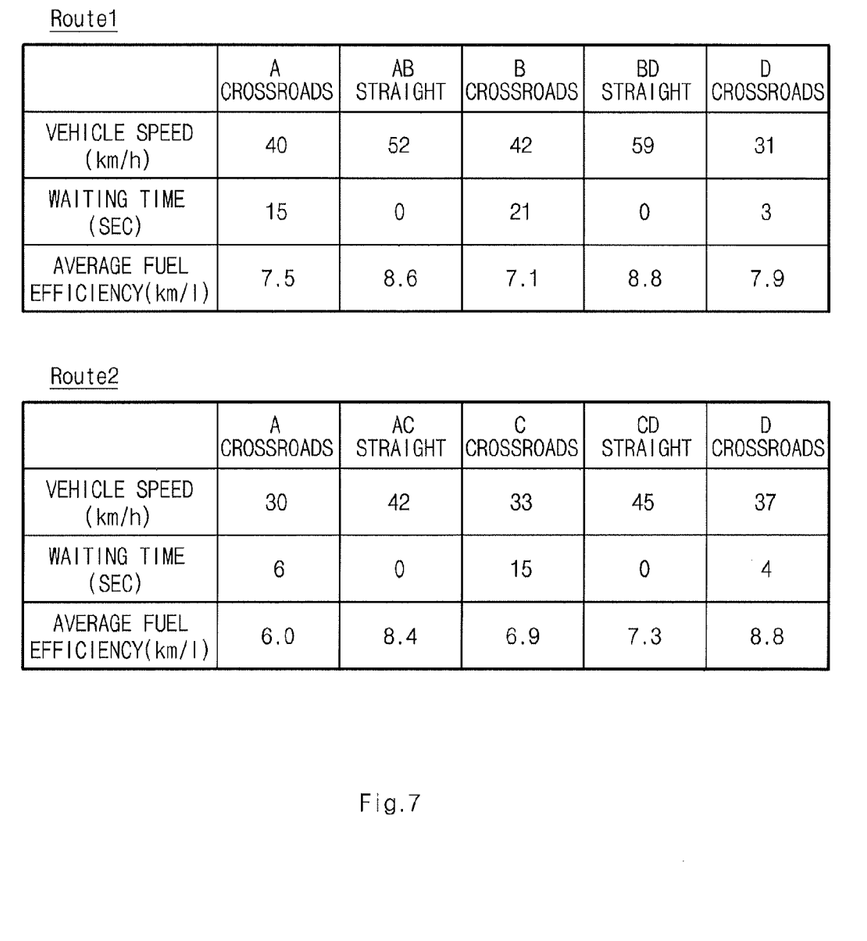
FIG. 7 shows exemplary numerical values of a variety of information obtained through transportation, fuel efficiency information, geographical information by a navigation server.

FIG. 7 shows exemplary numerical values of a variety of information obtained through transportation, fuel efficiency information, geographical information by the navigation server 200.

Referring to FIG. 7, the navigation server 200 divides Route 1 into an A crossroads section, an AB straight-traveling section, a B crossroads section, a BD straight-traveling section, and a D crossroads section. The navigation server 200 divides Route 2 into an A crossroads section, an AC straight-traveling section, a C crossroads section, a CD straight-traveling section, and a D crossroads section.

According to the aforementioned operations in individual sections, the navigation server 200 calculates a vehicle speed for each traveling direction, a waiting time for each traveling direction, average fuel efficiency for each traveling direction, and a road type for each traveling direction.

In Route 1, for example, a vehicle goes straight in the A crossroads section, a vehicle speed at the straight traffic lane is 40 km/h, a waiting time at the straight traffic lane is 15 seconds, average fuel efficiency is 7.5 km/l, and a road slope corresponds to a flatland.

In Route 2, for example, a vehicle turns to the right in the A crossroads section, a vehicle speed at the right-turn traffic lane is 30 km/h, a waiting time at the right-turn traffic lane is 6 seconds, average fuel efficiency is 6 km/l, and a road slope corresponds to a descent.

The navigation server 200 calculates an average vehicle speed from a departure and a destination using vehicle speed information and waiting time information obtained from all sections.

Assuming that the navigation server 200 does not consider the vehicle traveling direction, it uses the same value to calculate an average vehicle speed not only in the A crossroads section of Route 1 but also in the A crossroads section of Route 2. However, one embodiment of the present invention assigns different values to individual traffic lanes so as to calculate the average vehicle speed, so that it can obtain an accurate average vehicle speed for each traveling path.

Meanwhile, the navigation server 200 applies average fuel efficiency information obtained from all the sections to the process for calculating average fuel efficiency from the departure to the destination.

Likewise, assuming that the navigation server 200 does not consider the vehicle traveling direction, it uses the same value to calculate average fuel efficiency not only in the A crossroads section of Route 1 but also in the A crossroads section of Route 2. However, an embodiment of the present invention assigns different values to individual traffic lanes so as to calculate the average fuel efficiency, so that it can obtain an accurate average vehicle speed for each traveling path.

The navigation server 200 selects an optimum path according to average vehicle speed and average fuel efficiency.

For example, if the average vehicle speed and the average fuel efficiency in Route 1 are superior to those of Route 2, the navigation server 200 selects Route 1 as an optimum path, and informs the vehicle 100 of Route 1 as navigation information.

In contrast, if the average fuel efficiency of Route 1 is lower than that of Route 2 whereas the average vehicle speed of Route 1 is higher than that of Route 2, it is preferable that information about which one of Route 1 and Route 2 is better be transmitted to a driver of the vehicle 100 in response to the driver's selection.

For example, if the vehicle driver desires to select a faster path, the navigation server 200 transmits navigation information of Route 1 having a superior average vehicle speed to the target vehicle 100. If the vehicle driver desires to select a fuel-efficient path, the navigation server 200 may transmit navigation information of Route 2 having superior average fuel efficiency to the target vehicle 100. In this case, when receiving a request of the navigation information from the driver of the target vehicle 100, the navigation server 200 may also receive information about which one of vehicle speed and fuel efficiency is first considered from the driver of the target vehicle 100.

Furthermore, the navigation server 200 may propose a different path from the above-mentioned example according to geographical information.

For example, it is assumed that Route 1 and Route 2 have similar average fuel efficiencies and similar vehicle speeds within the error range of 10%. However, assuming that each of the AC straight-traveling section and the CD straight-traveling section in Route 1 is a descent, the AB straight-traveling section of Route 2 is an ascent, and the BD straight-traveling section of Route 2 is a descent, Route 1 having more descents may be more advantageous to the vehicle driver as compared to Route 2. Therefore, the navigation server 200 may inform the vehicle 100 of Route 1 as navigation information.

Figure 8:
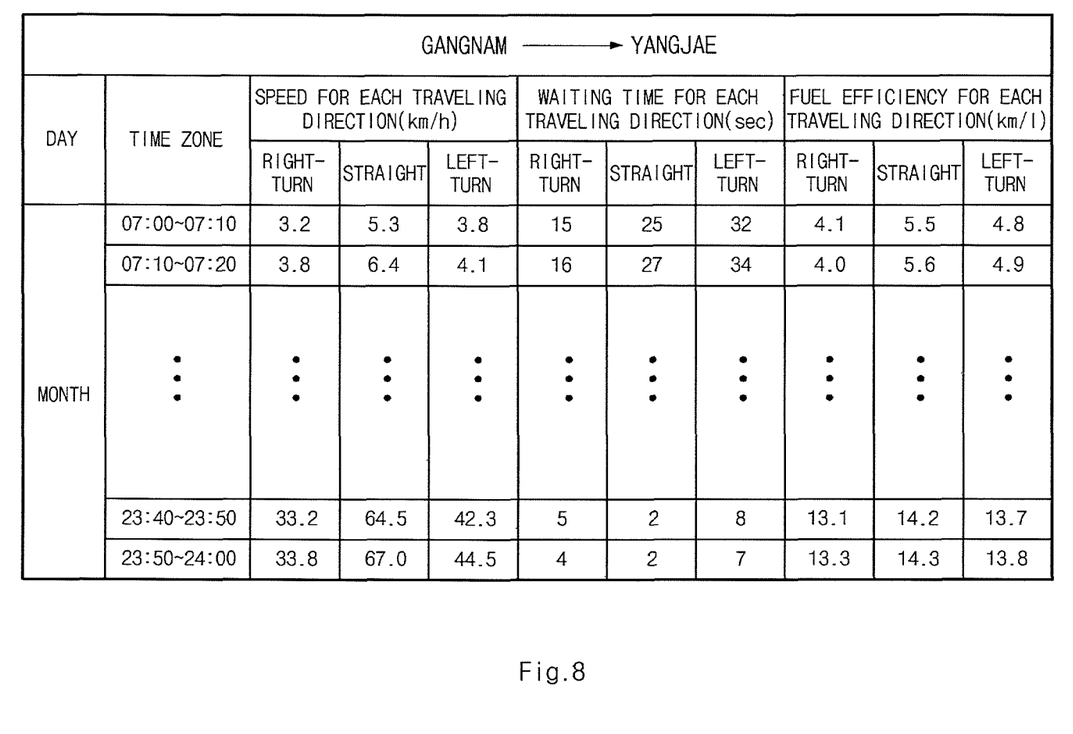
FIG. 8 shows information stored in a database (DB) in which transportation information and fuel efficiency information collected by a navigation server are configured in patterns.

FIG. 8 shows information stored in the DB 240 in which transportation information and fuel efficiency information collected by the navigation server 200 are configured in patterns.

As can be seen from the above-mentioned description, the navigation server may collect transportation information and fuel efficiency information from all vehicles accessing the navigation server 200.

Therefore, the navigation server 200 collects transportation information and fuel efficiency information from all the vehicles in the entire regions, accumulates the collected information, and stores it in the DB 240.

Referring to FIG. 8, in a region from subway station "A" to subway station "B", vehicle speeds of individual traveling directions, waiting times of individual traveling directions, and fuel efficiency values of individual traveling directions are accumulated and stored while being classified according to individual days and individual time zones.

The navigation server 200 collects information whenever vehicles pass through the corresponding region, so that it continuously updates the DB 240 on the basis of the collected information.

The navigation server 200 basically generates navigation information according to transportation information and fuel efficiency collected in real time as described above.

However, if no vehicle is present in a section contained in the selected traveling path (e.g., if no vehicle is running in the section at midnight) or if a communication status of the corresponding section is unstable due to weather deterioration), it is impossible for the navigation server 200 to acquire transportation information and fuel efficiency information in real time.

Therefore, the navigation server 200 may generate navigation information using the transportation information and the fuel efficiency information stored in the DB 240.

In addition, if a long period of time from the departure to the destination has elapsed, a road status (or road condition) is changed in every minute, an optimum path searched at the departure and an optimum path searched at a current time may be different from each other.

Under the above condition, real-time transportation information and real-time fuel efficiency information are used in the range from a start time to a predetermined time. After the lapse of a predetermined time, the navigation server 200 may generate navigation information using transportation information and fuel efficiency information stored in the DB 240.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A navigation system for a vehicle comprising:
   a receiver that receives transportation information and fuel efficiency information from one or more source vehicles located in a specific region;
   a remote central processing unit (CPU) that generates navigation information of the specific region using the transportation information and the fuel efficiency information;
   a transmitter that receives navigation information from the CPU, and transmits the received navigation information to a target vehicle; and
   a database that accumulates the transportation information and the fuel efficiency information of the specific region and stores the accumulated information,
   wherein the CPU provides the target vehicle with navigation information that is generated using real-time transportation information and real-time fuel efficiency information during a predetermined range from a start time to a predetermined time and provides the target vehicle with navigation information generated using transportation information and fuel efficiency information that is pre-stored in the database after the predetermined time.

2. The navigation system according to claim 1, wherein the CPU calculates a vehicle speed for each traveling direction of the one or more source vehicles, an average waiting time for each traveling direction of the one or more source vehicles, and an average fuel efficiency for each traveling direction of the one or more source vehicles using the transportation information and the fuel efficiency information, and generates the navigation information using the calculated information.

3. The navigation system according to claim 2, wherein the CPU, when a first route in which an average vehicle speed from a departure to a destination is excellent, is different from a second route in which fuel efficiency is excellent, informs the target vehicle of the first and second routes so that a vehicle driver is able to select one of the first and second routes.

4. The navigation system according to claim 2, wherein the CPU, when a plurality of identical routes are searched for in an operation for searching for a route on the basis of a distance from a departure to a destination, determines an optimum route using the transportation information and the fuel efficiency information.

5. The navigation system according to claim 4, wherein the CPU, when a first route in which an average vehicle speed from a departure to a destination is excellent, is different from a second route in which fuel efficiency is excellent, informs the target vehicle of the first and second routes so that a vehicle driver is able to select one of the first and second routes.

6. The navigation system according to claim 1, wherein the CPU additionally reflects geographical information of the specific region to generate the navigation information.

7. The navigation system according to claim 6, wherein the CPU, when a plurality of identical routes are searched for in the operation for generating the navigation information using the transportation information and the fuel efficiency information, determines an optimum route based on the geographical information.

8. The navigation system according to claim 7, wherein the geographical information includes information about a road slope.

9. The navigation system according to claim 1, wherein the CPU calculates an average fuel efficiency for each of the one or more source vehicles in a particular way according to a vehicle type of each of the one or more source vehicles.

10. The navigation system according to claim 1, wherein the CPU, upon receiving no transportation information and no fuel efficiency information from the source vehicles, generates the navigation information using the transportation information and the fuel efficiency information pre-stored in the database.

11. A navigation method for a vehicle by a navigation system comprising:
   a) receiving a route search request for a specific region from a target vehicle by a receiver of the navigation system;
   b) receiving transportation information and fuel efficiency information from source vehicles located in the specific region by the receiver;
   c) generating navigation information using the transportation information and the fuel efficiency information by a remote central processing unit (CPU) of the navigation system;
   d) transmitting the received navigation information to the target vehicle by a transmitter of the navigation system; and
   e) accumulating the transportation information and the fuel efficiency information of the specific region and storing the accumulated information in a database,
   wherein the CPU provides the target vehicle with navigation information that is generated using real-time transportation information and real-time fuel efficiency information during a predetermined range from a start time to a predetermined time and provides the target vehicle with navigation information generated using transportation information and fuel efficiency information that is pre-stored in the database after the predetermined time.

12. The navigation method according to claim 11, wherein the receiving step b) includes receiving information about a moving speed of each source vehicle located in the specific region, information about a crossroads waiting time of each source vehicle, information about fuel consumption of each source vehicle, and information about a moving distance of each source vehicle.

13. The navigation method according to claim 12, wherein the generating step c) includes:
   calculating a vehicle speed for each traveling direction of the source vehicles, an average waiting time for each traveling direction and an average fuel efficiency for each traveling direction; and
   generating the navigation information using the calculated information.

14. The navigation method according to claim 13, wherein the transmitting step d) includes:
   when a first route in which an average vehicle speed from a departure to a destination is excellent, is different from a second route in which fuel efficiency is excellent, informing the target vehicle of the first and second routes so that a vehicle driver is able to select one of the first and second routes.

* * * * *